United States Patent Office 2,929,707
Patented Mar. 22, 1960

2,929,707

METHOD OF FABRICATING A URANIUM-ZIRCONIUM HYDRIDE REACTOR CORE

Ivan F. Weeks, Livermore, and Walter V. Goeddel, San Diego, Calif., assignors, by mesne assignments, to the United States of America as represented by the United States Atomic Energy Commission No Drawing. Application January 13, 1955
Serial No. 481,706

6 Claims. (Cl. 75—211)

This invention is concerned with a method of making a uranium-zirconium hydride fuel structure for a nuclear reactor in which the uranium acts as the fuel and the zirconium hydride as the moderating material. More particularly, this invention is directed to a method of evenly dispersing uranium in a zirconium hydride moderator, the resultant material being usable, for example, as a target or reactor fuel core in nuclear applications.

Various zirconium hydride base systems have been proposed for nuclear reactor cores. Thermodynamic calculations indicate that the zirconium hydride-uranium oxide system, for example, will be unstable at elevated temperatures encountered in some power-production reactor cores. At these temperatures the system will form zirconium oxide and thus result in an accompanying loss of moderation. This is due to the fact that the capacity of zirconium to hold hydrogen is diminished when oxygen is put in the zirconium lattice. For equal hydrogen content, the dissociation pressure of zirconium hydride goes up when this occurs. Furthermore, if sodium is used as a primary coolant and there is hydrogen present from the hydride and/or the hydrogen atmosphere in the reactor and oxygen present from the uranium or zirconium oxide, there is the possibility of forming sodium hydroxide which would create a serious corrosion problem in the reactor. Uranium-zirconium hydride reactor core elements containing no oxygen have been formulated to prevent the above difficulties. These core elements have been made by first forming uranium powder by the decomposition of uranium hydride, adding the uranium powder to the zirconium hydride, and compacting the resultant mass. It is, however, impossible to control to any extent the porosity, homogeneity and concentration of the compact made by this prior process.

A compact made by the method of this invention can be controlled with respect to porosity, homogeneity and concentration to a desired degree, allowing free access of a hydrogen atmosphere within the reactor to as large a surface as possible. Basically, the method encompasses the formation of a uranium hydride and zirconium hydride compact by conventional powder metallurgical practices followed by a selective dissociation of the uranium hydride in that compact into uranium and hydrogen gas. The selective or preferential dissociation of the uranium hydride is accomplished by using temperature and pressure relationships which will not cause effective dissociation of the zirconium hydride. The metallic uranium formed by the dissociation process is evenly dispersed in the zirconium hydride, and a fuel and moderating core having a desired degree of spatial properties results.

An object of this invention is to provide a method of forming a reactor core.

Another object of this invention is to provide a method of incorporating uranium in a zirconium compound moderator.

A still further object of this invention is to provide a method of fabricating a homogeneous zirconium hydride-uranium reactor core element.

An additional object of this invention is to provide a method of making a zirconium hydride-uranium matrix.

A still further object of this invention is to provide a method of making a nuclear reactor fuel block.

A still further object of this invention is to provide a method of producing a uranium-zirconium hydride reactor core element having controllable porosity and homogeneity characteristics.

The instant new and novel method of forming uranium-zirconium hydride reactor cores preferably comprises three basic steps. First, a predetermined ratio of uranium hydride and zirconium hydride are mixed together. The hydrides are in the form of finely divided powders of a particle size (−200 mesh) conventional in the powder metallurgy field. Due to the fact that uranium hydride is pyrophoric, mixing and manipulation of the uranium hydride must be done in an inert atmosphere, such as helium, argon, nitrogen or carbon dioxide. The mixed powders are then pressed into compacts according to known powder metallurgy methods in which no binder is required and no sintering is necessary. For example, the powders may be placed in a die and subjected to a pressure in the neighborhood of 100 tons per sq. inch at room temperature. The resultant compacts or blocks are then heated in a vacuum to a temperature of about 300° C. For this last step any pressure may be chosen which is below the equilibrium or dissociation pressure of the uranium hydride at any particular temperature and above the equilibrium pressure of the zirconium hydride. At the temperature mentioned above, uranium hydride has an equilibrium pressure of about 25 mm., while the zirconium hydride has a negligible equilibrium pressure at this temperature. The pressures mentioned herein are of hydrogen expressed in mm. of Hg. The uranium hydride will decompose upon exposure to such temperature and pressure conditions, leaving very finely divided uranium metal evenly dispersed in the zirconium hydride matrix. During the decomposition of the uranium hydride the hydrogen originally in the hydride will leave the compacted core and enable the core to have a desired degree of porosity and homogeneity.

Since the fuel blocks after compacting and installation in the reactor will be sintered when the reactor first heats up, it is preferred that the fuel blocks, after compacting, be sintered under controlled conditions. During this sintering, the uranium hydride will decompose, as described in the above step, thus accomplishing both the sintering and decomposition in one heating step. The sintering operation should be carried out under a hydrogen atmosphere. It is to be understood that the amount of sintering in this operation is one of degree only, since the compact will inherently "sinter" to some extent during the usual decomposition step.

The present invention also contemplates decomposing the uranium hydride in a powdered compact made by a process differing from merely mixing together uranium hydride and zirconium hydride. This alternative method of making the compact entails mixing zirconium powder with uranium powder in suitable proportions and subsequently hydrogenating the mixture. Care must be taken to prevent alloying of the zirconium and uranium by excessive sintering since it has been found that the amount of hydrogen absorbed in hydrogenating is dependent on the amount of zirconium present. Under these alloying conditions, appreciable uranium hydride will not be formed. The compact of zirconium and uranium is heated under one atmosphere of hydrogen at 700° C. until absorption is complete. The compact is then cooled slowly while maintaining the hydrogen atmosphere. The uranium will start picking up hydrogen at about 300° C. Thus is formed a compact of zirconium hydride and uranium hydride. At this point the above-described selective decomposition step is used to give a core having uranium metal evenly dispersed in a zirconium hydride moderating material.

The uranium hydride used in the concerned invention is a black or dark grey powder having a specific gravity of approximately 11.4 grams per cc. The dissociation pressure of $UH_3$ is designated as $$\log p = \frac{-4500}{T} + 9.28$$

At 300° C. the uranium hydride has a decomposition pressure of approximately 25 mm. At 307° C. the value is 32.5 mm., at 357° C. the decomposition pressure is 434 mm., while at 424° C. the decomposition pressure is 1,010 mm. It can be seen that the dissociation may be effected by applying heat and vacuum at the lower temperatures or by applying heat alone when the dissociation pressure is above atmospheric.

The zirconium hydride is normally in the form of a brittle black powder of indefinite composition having a specific gravity for $ZrH_{1.92}$ of 5.47 grams per cc. Zirconium hydride is a stable powder not affected by either air or moisture. Zirconium hydride itself starts to decompose at temperatures about 400° C., but such decomposition is not rapid at these temperatures. It has been determined that even at temperatures of 500°–600° C. the partial decomposition of the zirconium hydride will not affect the core material which will essentially comprise the sought-for uranium evenly dispersed in the zirconium hydride moderator. $ZrH_{1.92}$ has a decomposition pressure of 0.05 mm. at 300° C., 370 mm. at 500° C. and 760 mm. (1 atmosphere) at 523° C. The dissociation pressure of a reasonably pure zirconium hydride compound may be designated as:

$$\log_{10} P \text{ atm.} = 7.40 - 2.66 \log_{10}(1.969 - x) - 8650/T$$

where $x$ is the mol ratio of hydrogen to zirconium in the compound. The governing factor is that the chosen temperature and pressure relationship be such that the uranium hydride is selectively decomposed in preference to the zirconium hydride. As explained above, negligible amounts of zirconium hydride decomposition do not detract from the final nuclear core material.

A typical example of a zirconium hydride-uranium core material suitable for use in a thermal reactor would contain about 150 mg. of uranium 235 per cc. of zirconium hydride. Thus, in this example the uranium content is approximately 2.7% by weight of the entire fuel core. It is to be understood that in a thermal reactor the zirconium hydride-uranium reactor core elements are within a hydrogen atmosphere which controls the amount of moderation of the core element. The ratio of hydrogen atoms to uranium 235 in the above example is 130. It has been determined that for the vast majority of uses of the instant fuel core in thermal reactors, that the amount of uranium 235 in the zirconium hydride matrix should be in the range of 0.01–5%. Percentages above those stated start to be in the "fast" reactor field as distinguished from the "thermal" reactor field. The process as described and claimed in the application is not limited to the aforementioned range, the process being capable of providing homogeneity and controlled porosity in zirconium hydride-uranium mixtures generally in any percentages. The actual amount of uranium 235 used will depend on design considerations, the specific use of the thermal reactor, and on the desired core size.

A further advantage of the instantly disclosed method of fabricating a zirconium hydride-uranium core is the possibility of forming the core directly around the heat transfer coils of a power reactor. The heat transfer coils would first be placed in a suitable die and then covered and surrounded by the mixed zirconium hydride and uranium hydride powders. The powders would then be compacted and subsequently sintered or heated to decompose the uranium hydride in place, as expressed above.

The instant process provides a method of making zirconium hydride-uranium reactor core elements with less manipulated steps, by simpler steps, and results in a product having a higher degree of porosity and better dispersion of the uranium within the zirconium hydride matrix. Such porosity and even dispersion allows the nuclear reactor to have a better cooling efficiency by allowing greater and more even penetration of the hydrogen atmosphere within the reactor throughout the core elements.

Although the invention has been described in detail, it is to be clearly understood that the same is by way of example only and is not to be taken by way of limitation, the spirit and scope of this invention being limited only by the terms of the appended claims.

We claim:

1. The method of making a nuclear reactor fuel block comprising forming a compact core of zirconium hydride and uranium hydride, and sintering said compact at a chosen temperature and pressure, said pressure being below the dissociation pressure of uranium hydride at that chosen temperature and above the dissociation pressure of zirconium hydride at that chosen temperature.

2. A method of forming a homogeneous zirconium hydride-uranium compact, which comprises intimately mixing zirconium hydride and uranium hydride powders, compacting the resulting mixture, heating the resulting compact at a chosen temperature and pressure, said pressure being below the dissociation pressure of uranium hydride at that chosen temperature and above the dissociation pressure of zirconium hydride at that chosen temperature.

3. The method of claim 2 wherein said heating is conducted at a temperature of approximately 300° C.–600° C. and at a pressure between approximately 25 millimeters of mercury and the ambient atmospheric pressure.

4. The method of claim 2 wherein said heating is conducted at a temperature of approximately 400° C. at the ambient atmospheric pressure.

5. A method of forming a zirconium hydride uranium compact which comprises intimately mixing uranium and zirconium powders, hydrogenating the resulting mixture to form a compact of uranium hydride and zirconium hydride, sintering said compact at a chosen temperature and pressure, said pressure being below the dissociation pressure of uranium hydride at that chosen temperature and above the dissociation pressure of zirconium hydride at that chosen temperature.

6. The method of claim 5 wherein said hydrogenating is conducted at approximately the ambient atmospheric pressure and at a temperature of approximately 700° C. until said compact of uranium hydride and zirconium hydride is formed.

No references cited.